(12) United States Patent
Majni

(10) Patent No.: US 9,114,932 B1
(45) Date of Patent: Aug. 25, 2015

(54) SHEET MATERIAL CARRYING DEVICE

(71) Applicant: Eric L. Majni, Knoxville, TN (US)

(72) Inventor: Eric L. Majni, Knoxville, TN (US)

( * ) Notice: Subject to any disclaimer, the term of this patent is extended or adjusted under 35 U.S.C. 154(b) by 0 days.

(21) Appl. No.: 14/617,045

(22) Filed: Feb. 9, 2015

(51) Int. Cl.
B65G 7/12 (2006.01)
B65D 71/00 (2006.01)

(52) U.S. Cl.
CPC .................................... B65G 7/12 (2013.01)

(58) Field of Classification Search
USPC ............... 294/15, 16, 164, 101, 102.1, 103.1, 294/104, 114; 24/498, 488
See application file for complete search history.

(56) References Cited

U.S. PATENT DOCUMENTS

| | | | | |
|---|---|---|---|---|
| 488,357 A | * | 12/1892 | Hill | 294/26 |
| 1,251,278 A | * | 12/1917 | Porter | 294/15 |
| 1,479,711 A | * | 1/1924 | Haarberg | 294/15 |
| 2,549,918 A | * | 4/1951 | Miller | 294/104 |
| 2,654,630 A | * | 10/1953 | Renfroe | 294/104 |
| 2,776,856 A | * | 1/1957 | Ingram | 294/16 |
| 3,041,101 A | * | 6/1962 | Lebre | 294/26 |
| 3,150,895 A | * | 9/1964 | Lebre | 294/16 |
| 3,336,068 A | * | 8/1967 | Renfroe | 294/101 |
| 3,851,358 A | | 12/1974 | Janosko | |
| 4,013,202 A | * | 3/1977 | Russo | 294/164 |
| 6,113,167 A | | 9/2000 | Mattis et al. | |
| 6,494,513 B2 | * | 12/2002 | Worthington | 294/16 |

* cited by examiner

Primary Examiner — Paul T Chin
(74) Attorney, Agent, or Firm — Luedeka Neely Group, PC

(57) ABSTRACT

A carrying device for carrying materials, such as plywood and the like. The device includes a frame configured for receiving sheet material to be carried; a mount pivotally mounted to the frame to enable the mount to pivot relative to the frame; and a compression handle pivotally mounted to the mount, the compression handle including a handle graspable by a hand of a user and a compression member contactable with a face of the sheet material to be carried. The mount is pivotal relative to the frame, as well as having a handle that is pivotally mounted to the mount. This combination facilitates use of the carrying device with either the left or the right hand of the user, and also enables a desired attitude of the sheet material to be carried.

4 Claims, 6 Drawing Sheets

SHEET MATERIAL CARRYING DEVICE

FIELD

This disclosure relates to the field of carrying devices. More particularly, this disclosure relates to a carrying device of improved construction for lifting and carrying wall board, plywood and like sheet materials, and that is adjustable to suit the work environment.

BACKGROUND

Carrying devices for carrying sheet building materials such as plywood, gypsum board, cabinets, and the like desire improvement. Conventional devices desire improvement in that they are generally ill-suited for carrying materials except in a level environment What is desired is a carrying device that is suitable for use with either the left or right hand of a user and is adjustable for adapting to various work conditions, such as carrying materials up and down stairs and the like.

The present disclosure advantageously provides an improved carrying device that is convenient to use and is adjustable to suit a variety of work site conditions.

SUMMARY

The above and other needs are met by a carrying device for carrying materials.

In one aspect, the carrying device includes a frame configured for receiving material to be carried; a mount pivotally mounted to the frame to enable the mount to pivot relative to the frame; and a compression handle pivotally mounted to the mount.

The compression handle includes a handle graspable by a hand of a user and a compression member contactable with a face of the material to be carried.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
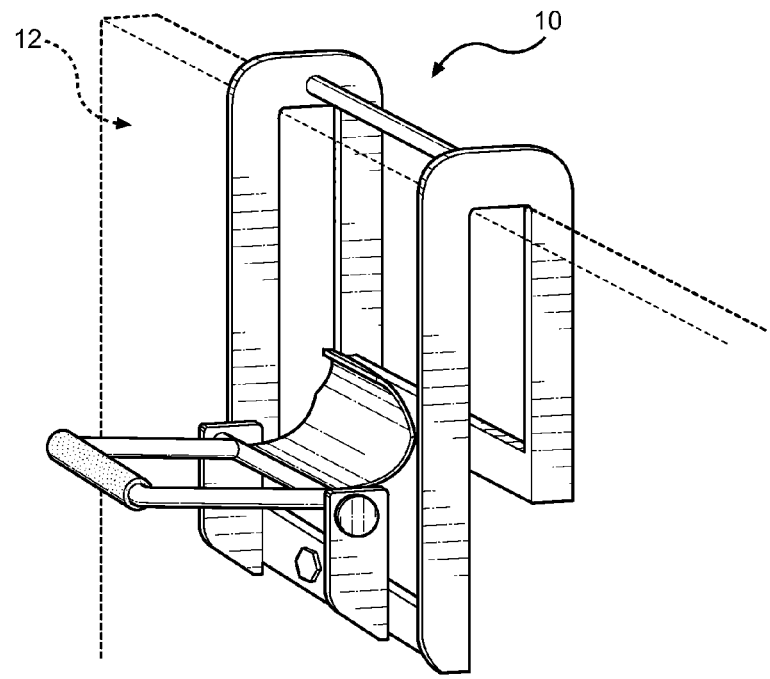
FIG. 1 is a perspective view of a carrying device according to the disclosure.
Figure 2:
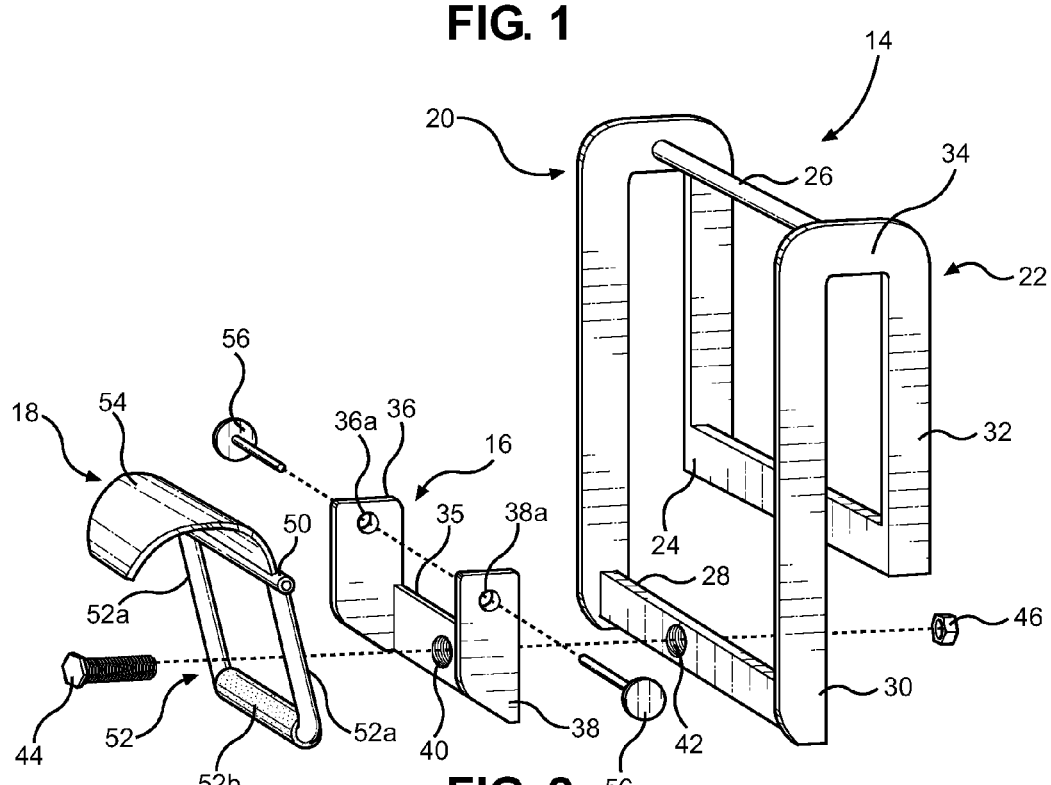
FIG. 2 is an exploded view of the carrying device of FIG. 1.
Figure 3:
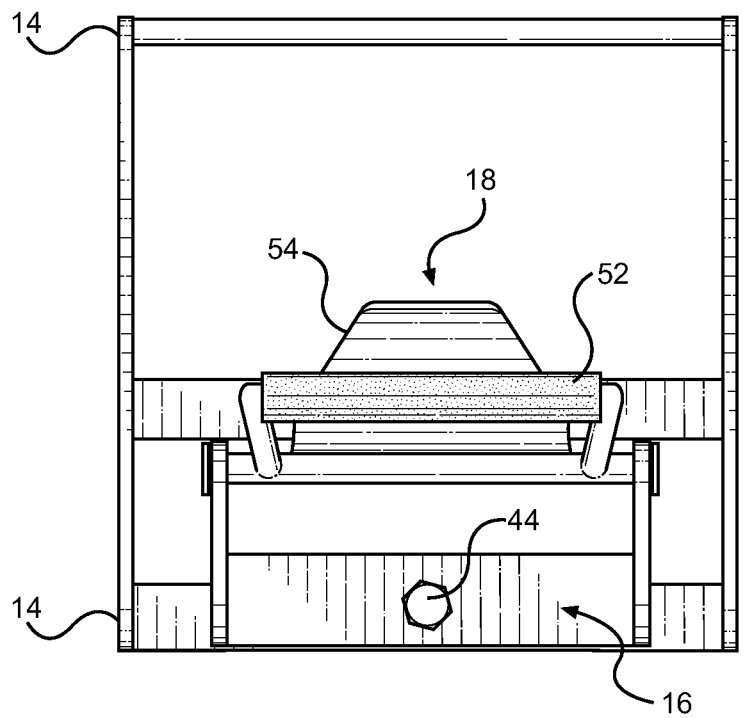
FIG. 3 is a front view of the carrying device of FIG. 1.

With reference to the drawings, the disclosure relates to a carrying device 10 configured for carrying bulky, rigid sheet materials, generally represented by reference numeral 12.

The carrying device 10 is particularly suitable for use carrying building materials such as gypsum board and plywood sheeting. In this regard, it will be understood that the carrying device 10 is also suitable for carrying other objects such as cabinets, vanities, containers, and the like, having a wall or the like that is accessible for locating the carrying device 10 thereon. For example, the carrying device 10 may be utilized to grip a rear portion or a side of a cabinet, or a garbage container, or the like.

In contrast to existing carrying devices, the carrying device 10 is suitable for use with either the right or left arm and hand of a user and enables adjustment of the attitude of a handle grasped by the user relative to the sheet material being carried.

The feature of being able to adjust the attitude of the handle grasped by the user relative to the sheet material is very useful for orienting the sheet material so as to not interfere with the carrying of the sheet material up and down stairs and the like, while still maintaining a comfortable hand position for the user.

The carrying device 10 includes a rigid and elongate J-shaped frame 14, a mount 16 pivotably mounted to the frame 14, and a compression handle 18 pivotally mounted to the mount 16.

The rigid elongate J-shaped frame 14 includes a pair of J-shaped members 20 and 22 spaced apart from one another by at least one cross member, and preferably a plurality of cross members 24, 26, and 28. For carrying plywood and gypsum board sheets, the members 20 and 22 are preferably spaced apart a distance sufficient to provide a gap for receiving the sheet material or object to be carrier.

It will be understood that the spacing between the J-shaped members 20 and 22 may be varied depending on the materials designed to be carried by the carrying device 10. Also, it will be understood that the frame 14 may be of adjustable dimension so as to be able to be adjusted to fit a variety of sheet materials or objects to be carried. The frame 14 is desirably made of steel or the like, with the interconnections provided by welds or fasteners. However, the frame 14 may be of other construction, such as molded plastic construction.

Each of the J-shaped members 20 and 22 of the frame 14 has a major length 30 spaced apart from a minor length 32 and substantially parallel thereto, with an intermediate length 34 therebetween. Thus, as shown for example in FIG. 5, the major length 30 is spaced a distance A from the minor length 32, and the free end of the major length 30 is located a distance B above the free end of the minor length 32. For carrying typical plywood and gypsum board, the frame 14 is configured so that the distance A is about 1.25 inches and the distance B is about 3 inches.

It will be understood that the frame 14 may be made in various other dimensions to suit the material or object to be carried. Also, if desired, the J-shaped members may be of adjustable dimension. For example, the intermediate length 34 may be of two piece construction slidable relative to one another to adjust the gap space, with a fastener or ball and detent structures cooperating to enable adjustment of the length of the intermediate length 34. Likewise, the other components of the frame 14 may be of adjustable construction to enable the size of the frame to be adjusted.

The mount 16 is pivotally mounted relative to the frame 14 between the lateral spacing of the J-shaped members 20 and 22. The mount 16 is located adjacent the major length 30 and opposite the minor length 32 of each of the J-shaped members 20 and 22, and preferably adjacent the free ends of the major lengths 30. For example, in the depicted carrying device 10, the mount 16 is pivotally mounted to the cross member 28.

The mount 16 is desirably made of metal construction, but may be made of other materials, such as plastic. The mount 16 has a mount surface 35 configured for placement adjacent the frame 14, and a pair of spaced apart legs 36 and 38 for cooperating with the compression handle 18. The mount surface 35 is preferably provided as by a planar member and the legs 36 and 38 may be planar members mounted normal to the mount surface 35 so as to extend away from the frame 14 when the mount 16 is mounted to the frame 14.

The purpose of the mount 16 is to provide a structure that is able to pivot relative to the frame 14, and onto which the compression handle 18 may be pivotally mounted. In this regard, as explained more fully below, the mount 16 pivots to enable the attitude or orientation of the compression handle 18 to be adjusted relative to the frame 14 and the sheet material 12 prior to carrying of the sheet material 12 with the device.

Once the compression handle 18 is engaged and the sheet material 12 is lifted using the device 10, the position of the mount 16 is fixed relative to the frame 14. This enables the compression handle 18 to be oriented relatively level relative to the user, or to otherwise suit the user, but the frame 14 and the sheet material 12 to incline or decline relative to the handle 18 to better suit the work environment.

In regard to pivotal mounting of the mount 16 to the frame 14, the mount surface 35 may have a central aperture 40 therethrough for aligning with a corresponding aperture 42 through the cross member 28. A bolt 44 and a nut 46 may be provided to pass through the apertures 40 and 42 to pivotally mount the mount surface 35, and hence the mount 16, to the frame 14. It will be understood that other mounting structures, including bearings and like structures may be utilized for pivotally mounting the mount 16 to the frame 14.

Figure 4:
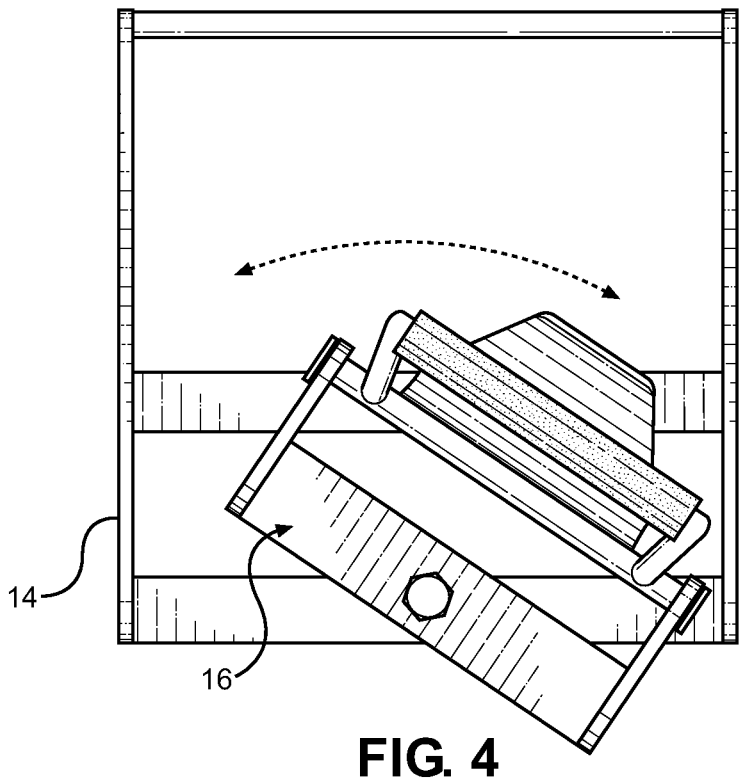
FIG. 4 depicts a pivot feature of the carrying device of FIG. 1.
Figure 7:
FIGS. 7, 8 and 9 depict various uses of the carrying device of FIG. 1.

In this regard, FIG. 4 shows the desired pivotal motion of the mount 16 relative to the frame 14, as indicted by the bi-directional arrow. That is, the mount 16 may pivot left or right relative to the length axis of the frame 16. This aspect will be discussed more fully below in connection with FIGS. 7-9.

The legs 36 and 38 are configured to have the compression handle 18 pivotally mounted thereto. This may be accomplished as by having apertures 36a and 38a provided on the legs 36 and 38, respectively. Alternative mounting structures such as bearing surfaces and the like may also be utilized.

The compression handle 18 is desirably made of metal construction, but may be made of other materials, such as plastic. The compression handle 18 includes a central axle 50, a handle 52, and a compression member 54. The axle 50 is configured to be pivotally mounted between the legs 36 and 38 of the mount 16. For example, the ends of the axle 50 may be open and aligned with the apertures 36a and 38a, with fasteners 56 located to extend therethrough to pivotally mount the axle 50 to the legs 36 and 38. Other manner of pivotal mounting may be used, including bearings, washers, and the like.

The handle 52 is a generally u-shaped member configured to have legs 52a thereof connected to the axle 50, as by welding, fasteners or the like, and an upper cross-piece 52b of the u-shape grasped by the hand of a user. In this regard, foam padding or the like may be provided on the cross-piece 52b for comfort. The cross-piece 52b is the portion of the handle 52 grasped by the user during carrying of the sheet material 12, and the pivoting of the mount 16 as described enables the cross-piece 52 to be maintained in a desirably comfortable attitude or orientation for the user.

Figure 5:
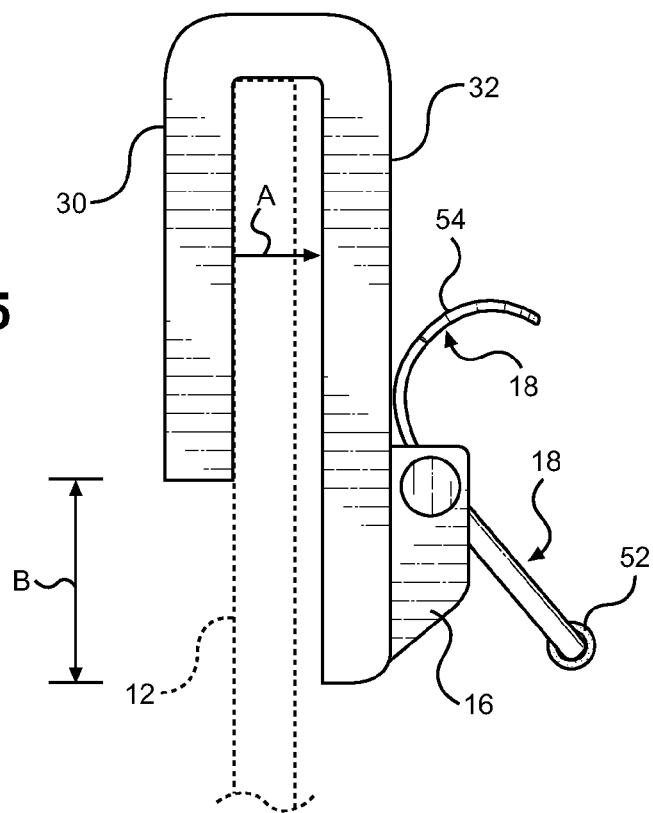
FIGS. 5 and 6 are side views showing operation of the carrying device of FIG. 1.
Figure 6:
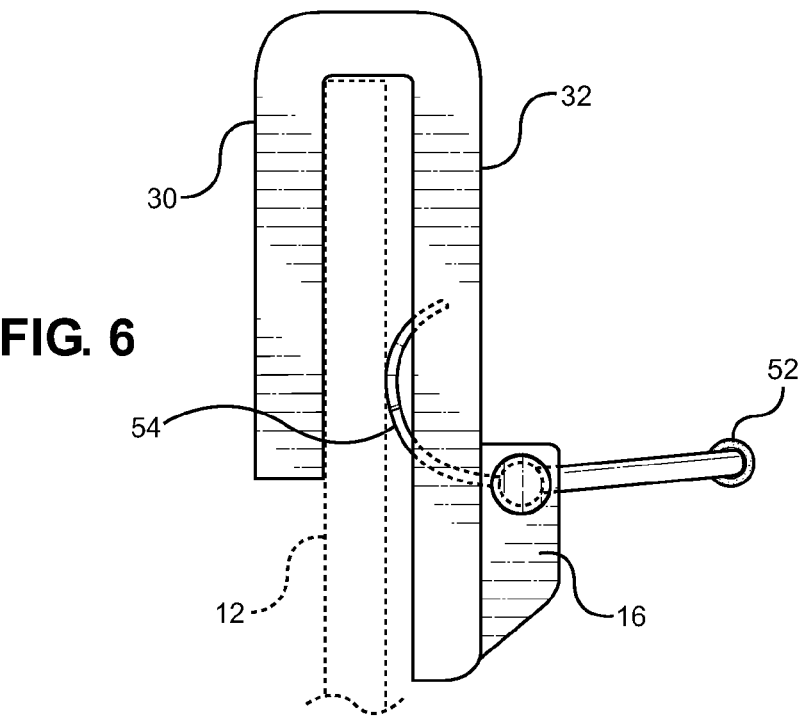

The compression member 54 is provided by a smooth convex or outwardly curved surface locatable so as to contact a face of the sheet material 12 to be carried, as best seen in FIGS. 5-6. The compression member 54 is made of a relatively thin but generally stiff material, such as steel plating, curved to have a radius of about 1.5 inches, with a length sufficient to provide an arc of from at least about 100 degrees to no more than about 180 degrees, and preferably configured to be about 160 degrees. The arch length enables the carrying device 10 to be used with a wide range of thicknesses of the sheet material 12.

A portion, such as an end of the compression member 54, is fixed to the axle 40, as by welding and the other end is free. The width of the compression member 54 preferably tapers so as to reduce in dimension from the axle 40 to the free end to provide an aesthetically pleasing appearance and to provide clearance for the compression member 54 to pivot relative to the J-shaped members 20 and 22. A compressible material, such as a rubber coating or the like may be provided on the compression member 54 for cushioning the sheet material 12 and also providing an enhanced lifting surface.

Returning to FIG. 5, to enable one to position the frame 14 onto the sheet material 12 to be carried, the user will initially pivot the handle 52 to locate the compression member 54 away from the frame. Once the sheet material 12 is received by the frame 14, the handle 52 is pivoted to bring the compression member 54 into engagement with the sheet material 12.

At the time the compression member 54 is initially engaged with the sheet material 12, the pressure applied by the compression member 54 to the sheet material 12 is relatively light absent a lifting force being applied to the handle 52 to lift the sheet material 12. Thus, at this time the mount 16 may be pivoted or angularly adjusted as shown in FIG. 4 to adjust the relative attitude of the mount 16 and the handle 52 to the sheet material 12 or of the sheet material 12 to the frame 14. Once a lifting force is applied to the handle 52 to lift the sheet material 12, the position of mount 16 and the sheet material 12 to one another is fixed.

The ability to adjust the angular orientation of the mount 16 is advantageous to customize the relative positions of the frame 14 and the sheet material 14 to fit the carrying circumstances. For example, when carrying the sheet material in an environment where the attitude of the sheet material 12 may be relatively level to the ground, such as when carrying along level ground or up a ladder (FIG. 7), it is generally preferred to locate the center of the length of the sheet material 12 relative to the center of the frame 14, with the mount 16 generally aligned with or level to the sheet material 12 or other material or object to be carried.

As will be appreciated, this provides the handle 52 in a generally level orientation for grasping by the user, with the sheet material also substantially level. The device 10 is shown being used with the right arm and hand of the user. It will be appreciated that the device 10 could be reversed and installed on the opposite side of the sheet material 12 or other material or object to be carried to permit the user to carry using the left arm and hand.

Figure 8:
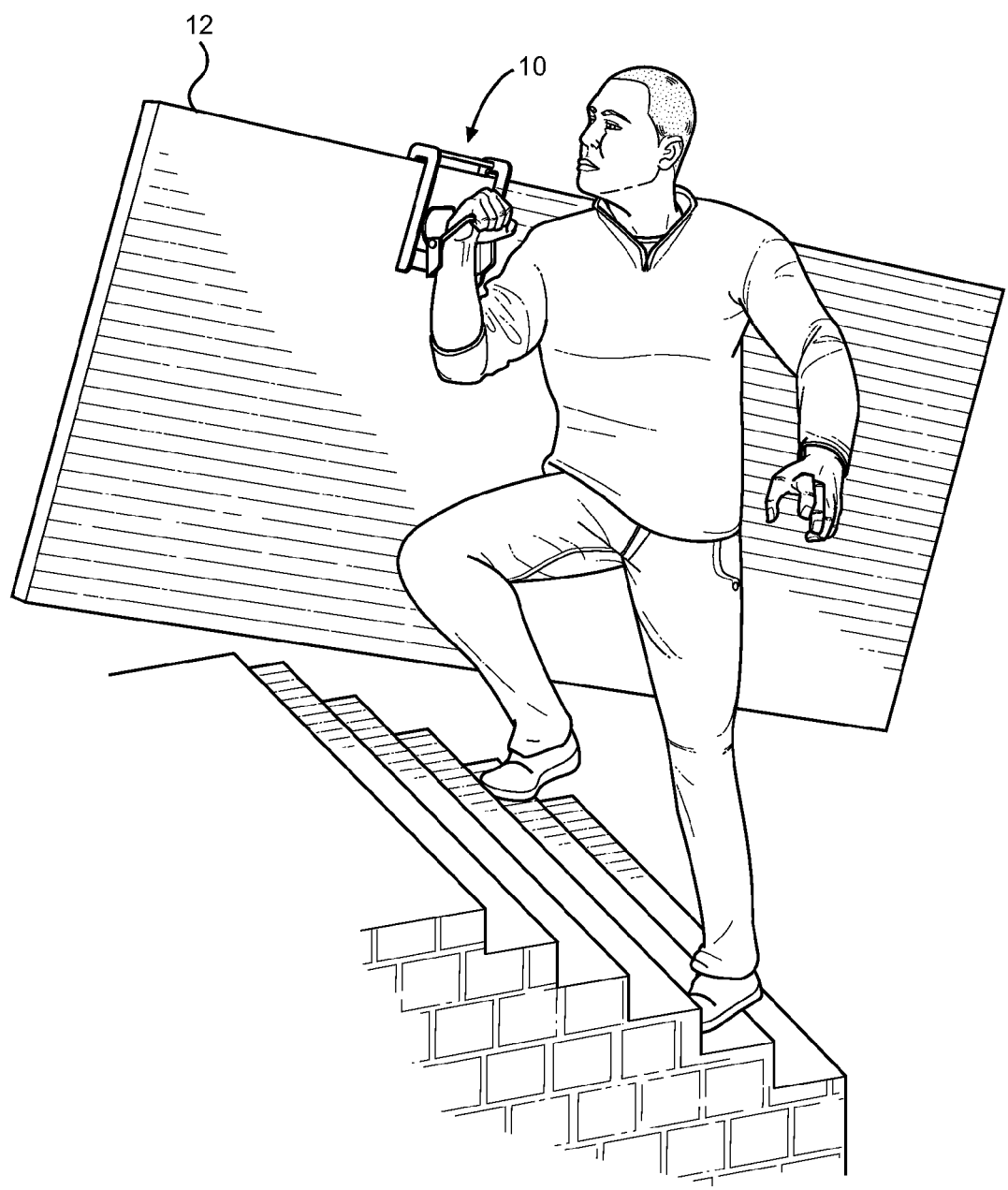

When the sheet material 12 is to be carried up a grade, such as up a flight of stairs, as shown in FIG. 8, it is preferred to locate the centerline of the sheet material 12 rearward of the frame 14, and to have the sheet material 12 inclined to match the incline of the stairs. The mount 16 enables the sheet material 12 to be maintained at a desired incline, while still enabling the handle 52 to be oriented relatively level for grasping by the user. It will be appreciated that the device 10 could be reversed and installed on the opposite side of the sheet material 12 or other material or object to be carried to permit the user to carry using the left arm and hand.

Figure 9:
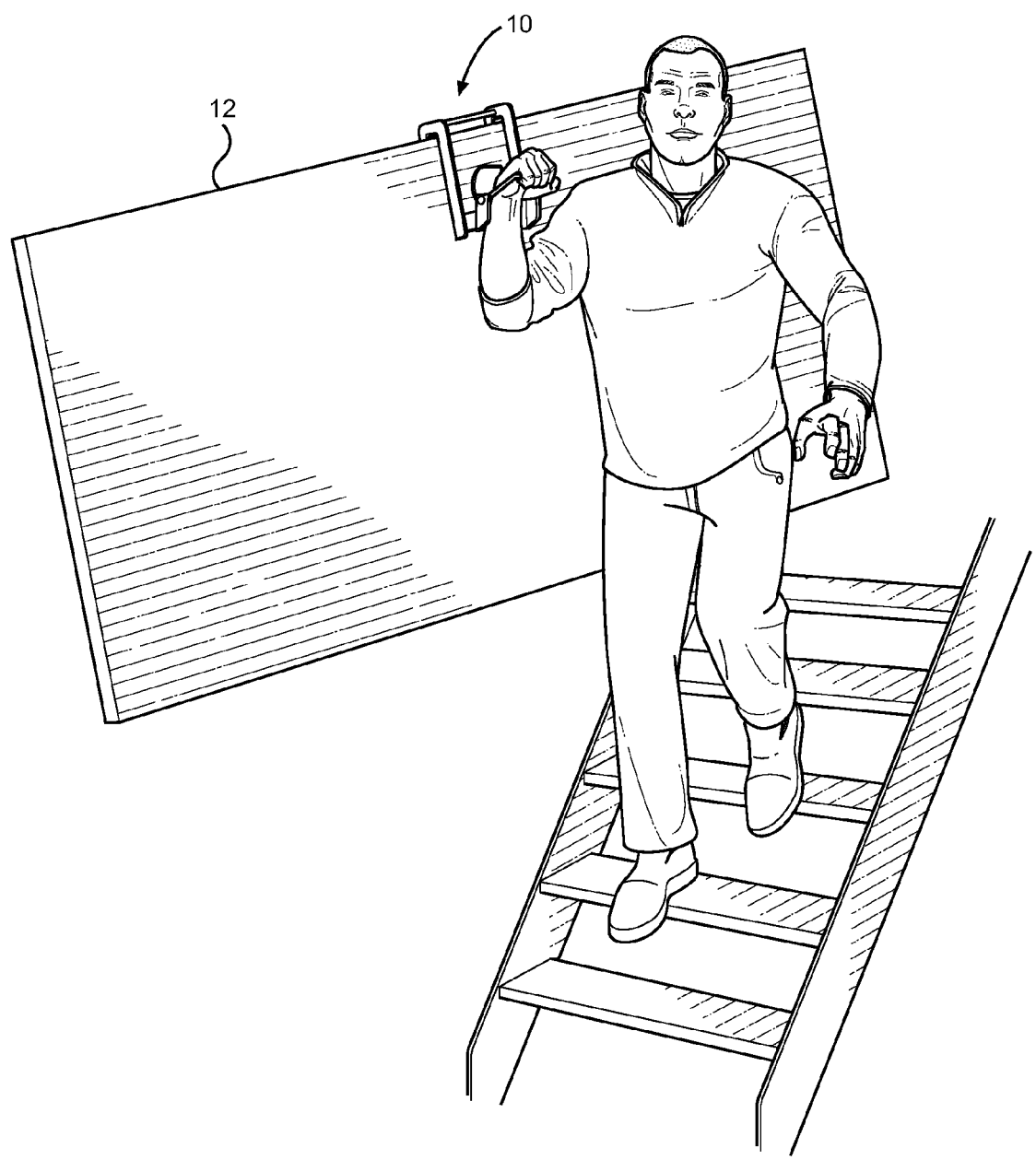

Likewise, when the sheet material 12 is to be carried down a grade, such as down a flight of stairs, as shown in FIG. 9, it is preferred to locate the centerline of the sheet material 12 forward of the frame 14, and to have the sheet material 12 declined to match the decline of the stairs. The mount 16 enables the sheet material 12 to be maintained at a desired decline, while still enabling the handle 52 to be oriented relatively level for grasping by the user. It will be appreciated that the device 10 could be reversed and installed on the opposite side of the sheet material 12 or other material or object to be carried to permit the user to carry using the left arm and hand.

Accordingly, it will be appreciated that the carrying device 10 is configured for lifting and carrying wall board, plywood and like sheet materials, and is adjustable to suit the work environment. The carrying device 10 utilizes the mount 16 which is pivotal relative to the frame 14, as well as having the handle 52 that is pivotally mounted to the mount 16. This combination facilitates use of the carrying device 10 with either the left or the right hand of the user, and also enables a desired attitude of the sheet material 12 to be carried.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A carrying device for carrying materials, the device comprising:
    a frame configured for receiving material to be carried;
    a mount pivotally mounted to the frame to enable the mount to pivot relative to the frame; and
    a compression handle pivotally mounted to the mount, the compression handle including a U-shaped handle graspable by a hand of a user and having a cross-piece graspable by the user and legs connected to an axle pivotally mounted to the mount, and a compression member contactable with a face of the material to be carried.

2. The carrying device of claim 1, wherein the compression member comprises an outwardly curved surface locatable so as to contact the face of the material to be carried.

3. The carrying device of claim 1, wherein the frame includes a pair of J-shaped members spaced apart from one another.

4. The carrying device of claim 1, wherein the material comprises a sheet material.

* * * * *